US012334668B2

(12) United States Patent
Schwan

(10) Patent No.: US 12,334,668 B2
(45) Date of Patent: Jun. 17, 2025

(54) HOUSING CAP AND HOUSING FOR AN ELECTRICAL CONNECTION ASSEMBLY AS WELL AS ELECTRICAL CONNECTION ASSEMBLY

(71) Applicant: TE Connectivity Germany GmbH, Bensheim (DE)

(72) Inventor: Ralf Schwan, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 345 days.

(21) Appl. No.: 17/862,873

(22) Filed: Jul. 12, 2022

(65) Prior Publication Data

US 2023/0012994 A1 Jan. 19, 2023

(30) Foreign Application Priority Data

Jul. 13, 2021 (DE) ......................... 102021118094.5

(51) Int. Cl.
*H01R 13/447* (2006.01)
*H01R 4/30* (2006.01)
*H01R 13/52* (2006.01)

(52) U.S. Cl.
CPC ............. *H01R 13/447* (2013.01); *H01R 4/30* (2013.01); *H01R 13/5213* (2013.01)

(58) Field of Classification Search
None
See application file for complete search history.

(56) References Cited

U.S. PATENT DOCUMENTS 5,977,485 A 11/1999 Yoshimura et al.
8,014,143 B2 * 9/2011 Chang ................ H01R 13/5213 361/679.31
8,858,255 B2 * 10/2014 Boutin ................ H01R 13/447 439/527
10,185,372 B1 * 1/2019 Heller .................... G11B 33/08
10,476,180 B2 11/2019 Eckel et al.
10,910,800 B1 2/2021 Baseri et al.
2006/0155280 A1 7/2006 Siebens et al.
2011/0223466 A1 9/2011 Lee et al.
2015/0244103 A1 8/2015 Kashiwada et al.
2020/0128683 A1 * 4/2020 Heller .................. G11B 33/025
2021/0184393 A1 * 6/2021 Hiller ................ H01R 13/5202
2021/0384668 A1 12/2021 Attarzadeh et al.

FOREIGN PATENT DOCUMENTS

AU 1975085613 B1 4/1977
DE 69802289 T1 6/2002
DE 102015216541 A1 3/2017
DE 102018127899 A1 5/2020
(Continued)

OTHER PUBLICATIONS

German Office Action, Application No. 102021118094.5, Dated: Feb. 17, 2022, 7 pages.
(Continued)

*Primary Examiner* — Tho D Ta
(74) *Attorney, Agent, or Firm* — Barley Snyder

(57) ABSTRACT

A housing cap for closing an opening of a housing part includes a cover section covering the opening, a stop projecting away from the cover section, and a fastening element affixing the housing cap to the opening.

19 Claims, 5 Drawing Sheets

(56) References Cited

FOREIGN PATENT DOCUMENTS

| | | | | | |
|---|---|---|---|---|---|
| DE | 102019132391 | A1 | * | 6/2021 | ........... H01R 13/447 |
| EP | 0822614 | A1 | | 2/1998 | |
| EP | 1993116 | A1 | | 4/2008 | |
| JP | S61032971 | A | | 2/1986 | |
| JP | 2015162278 | A | | 9/2015 | |
| JP | 2016207484 | A | | 12/2016 | |
| JP | 2017188322 | A | | 10/2017 | |
| JP | 6537604 | B2 | | 7/2019 | |
| WO | 9510857 | A1 | | 4/1995 | |
| WO | 9908062 | | | 2/1999 | |

OTHER PUBLICATIONS

Korean Office Action dated Mar. 12, 2024 with English translation, corresponding to Application No. 10-2022-0084786, 14 pages.
Japanese Office Action dated Sep. 5, 2023 with English translation, corresponding to Application No. 2022-110118, 10 pages.
Office Action from the Intellectual Property of India dated Feb. 9, 2023, corresponding to Application 202244039298, 5 pages.
Search Report from the European Patent Office dated Dec. 5, 2022, corresponding to Application No. 22184575.3-1201, 12 pages.
European Patent Office Action dated Oct. 17, 2024, corresponding to Application No. 22 184 575.3-1201, 11 pages.

* cited by examiner

HOUSING CAP AND HOUSING FOR AN ELECTRICAL CONNECTION ASSEMBLY AS WELL AS ELECTRICAL CONNECTION ASSEMBLY

CROSS-REFERENCE TO RELATED APPLICATIONS

This application claims the benefit of the filing date under 35 U.S.C. § 119(a)-(d) of German Patent Application No. 102021118094.5, filed on Jul. 13, 2021.

FIELD OF THE INVENTION

The present invention relates to a housing of an electrical connection assembly and, more particularly, to a housing cap of the housing.

BACKGROUND

Screw connections are used in electrical connection assemblies in many applications in automotive and energy technology because they can be used to produce comparatively high contact forces and the contact resistances arising can consequently be kept low. With increasing system size and complexity, the number of screw connections increases and, at the same time, the risk increases that screws of individual screw connections are accidentally not screwed in or at least not screwed in completely during production or maintenance. A screw-by-screw individual examination with a tool or by hand creates additional expenditure in work and time. In addition, individual screw connections can then also again be accidentally overlooked.

In addition, electrical connection assemblies often have to be surrounded by a housing for reasons of electrical safety, for which reason the screw connections are usually arranged within the housing, are accessible only via a housing opening, and are accordingly visible from the outside to a limited degree. In addition, the housing opening is often closed to protect against moisture and/or dirt so that screws that are not screwed in or at least not screwed in completely can remain undetected all the more easily.

SUMMARY

A housing cap for closing an opening of a housing part includes a cover section covering the opening, a stop projecting away from the cover section, and a fastening element affixing the housing cap to the opening.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
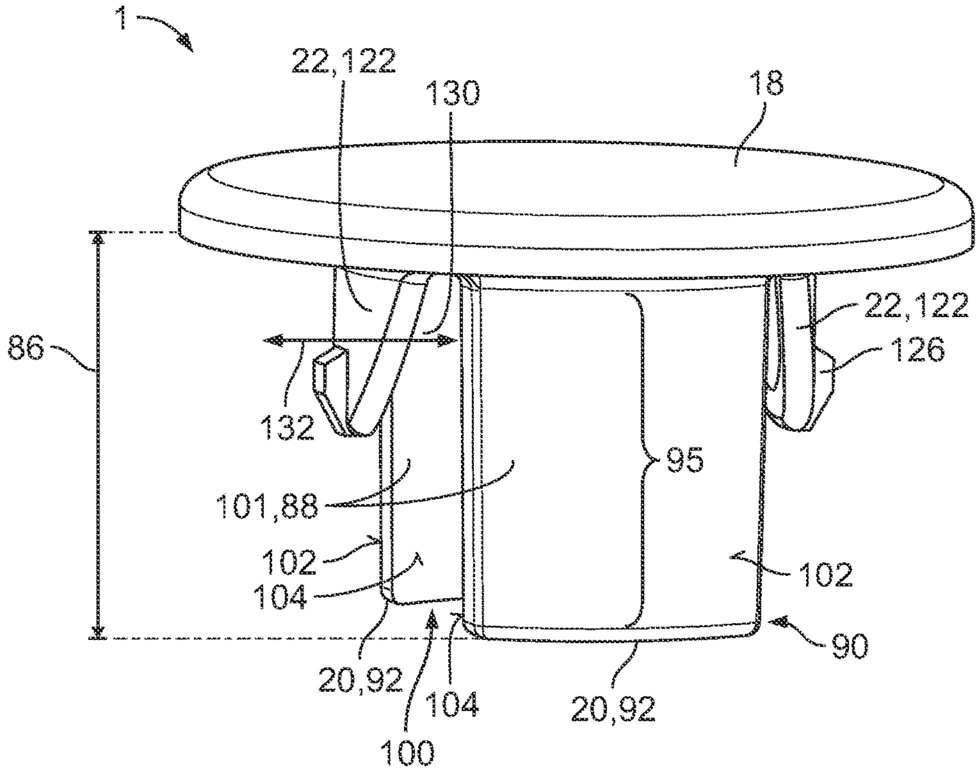
FIG. 1 is a perspective view of a housing cap according to a first embodiment.

The invention shall be explained in more detail hereafter by way of example with reference to the drawings. The feature combinations illustrated in the embodiments shown by way of example can be supplemented by further features in correspondence with the properties of the invention required for a specific application. Individual features can also be omitted from the embodiments described if the effect of these features is of no relevance for a specific application. The same reference numerals in the drawings are used for elements having the same function and/or the same structure.

The schematic structure of housing cap 1 according to the invention shall be described hereafter according to exemplary embodiments with reference to FIGS. 1 to 6. Furthermore, the schematic structure of a housing 2 according to the invention and an electrical connection assembly 4 according to the invention shall be explained with reference to FIGS. 3 to 7.

Housing 2 protects electrical connection assembly 4 from unwanted contact, dirt, and/or moisture, wherein at least one screw 8 of electrical connection assembly 4 is arranged in interior 6 of housing 2. For example, electrical connection assembly 4 can be an electrical connector 10 with a screw connection 12 and housing 2 can be a corresponding connector housing 14. Housing cap 1 serves to close at least one opening 16 of housing 2 through which the at least one screw 8 is accessible, and at the same time acts as a control gauge for reliably verifying that the at least one screw 8 is screwed in completely without additional effort. This shall be explained in more detail hereafter.

As can be seen from FIG. 1, housing cap 1 comprises a cover section 18, at least one stop 20 which projects in an embodiment perpendicularly from cover section 18, and at least one fastening element 22. In the embodiments shown, housing cap 1 comprises two stops 20 and two fastening elements 22. Depending on the application, yet more stops 20 and/or fastening elements 22 can of course also be provided. The number of stops 20 and fastening elements 22 can differ from one another.

Cover section 18 is provided to cover the at least one opening 16. For this purpose, an outer contour 24 of cover section 18 may be larger than an inner contour 26 (see FIG. 7) of the at least one opening 16. Alternatively, outer contour 24 can also correspond to inner contour 26. In other words, an outer circumference 28 of cover section 18 can be larger than or equal to an inner circumference 30 of the at least one opening 16. For example, in the case of a round cover section 18 for covering a round opening 16, an outer diameter 32 of round cover section 18 can be larger than or equal to an inner diameter 34 of round opening 16. This not only ensures that the cover section 18 covers the at least one opening 16 exactly, but also that the at least one screw 8 is actually present in the housing 2. If the screw 8 was forgotten from the outset, the housing cap 2 sinks into the at least one opening 16 and thereby inevitably signals that the screw 8 is missing.

As shown in FIG. 1, cover section 18 can be configured to be planar. In order to cover an elongate opening 36 and/or to cover several adjacently disposed openings, cover section 18 can respectively be elongate and plate-shaped (see FIG.

2). Housing cap 1 can optionally have longitudinal ribs 38 and/or transverse ribs 40 which reinforce cover section 18.

Housing cap 1 can optionally have a sealing section 42 for sealing a gap 44 between housing cap 1 and the remainder of housing 2. Sealing section 42 is formed by a seal 46 with sealing lips 48 pointing inwardly and/or outwardly. Seal 46 is inserted, for example, in a circumferential groove 50 of cover section 18 as a separate sealing element 52 (see FIG. 6) or is injected into groove 50 to form a two-component member with housing cap 1.

Figure 4:
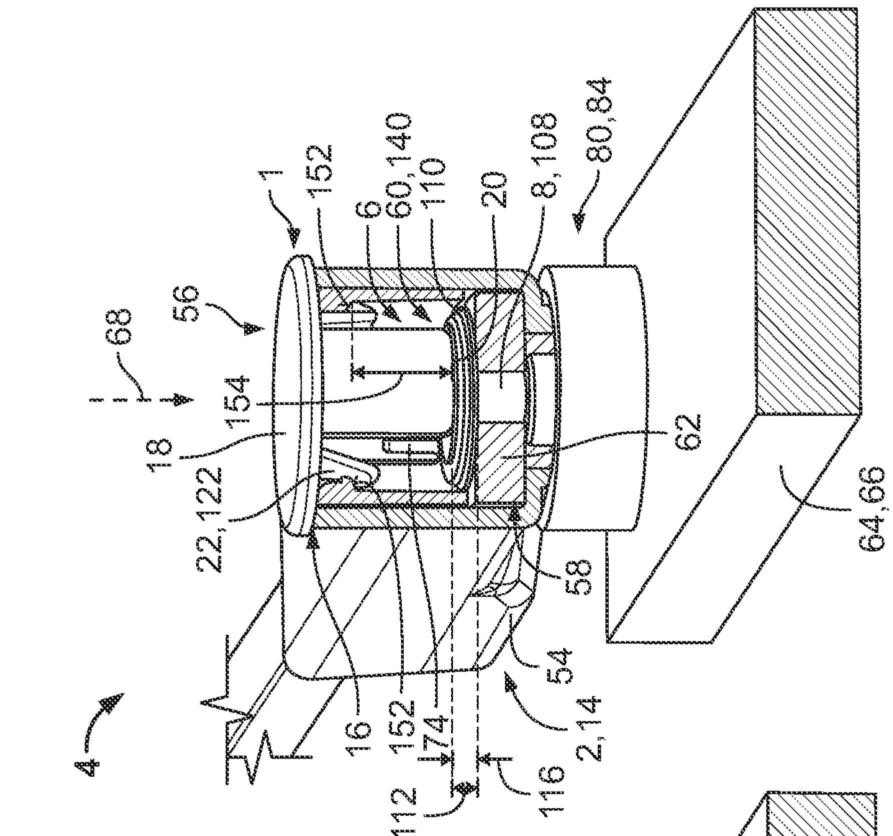
FIG. 4 is a sectional perspective view of an electrical connection assembly with the housing cap of FIG. 3.
Figure 3:
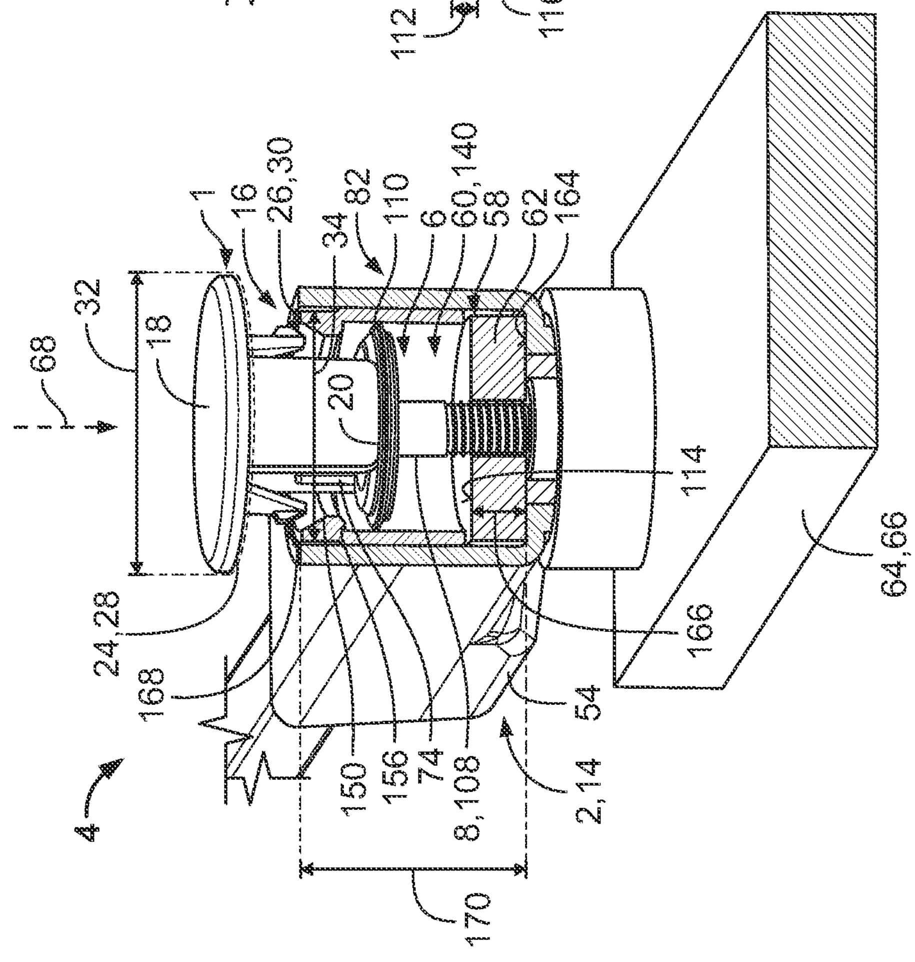
FIG. 3 is a sectional perspective view of an electrical connection assembly with the housing cap of FIG. 1.
Figure 5:
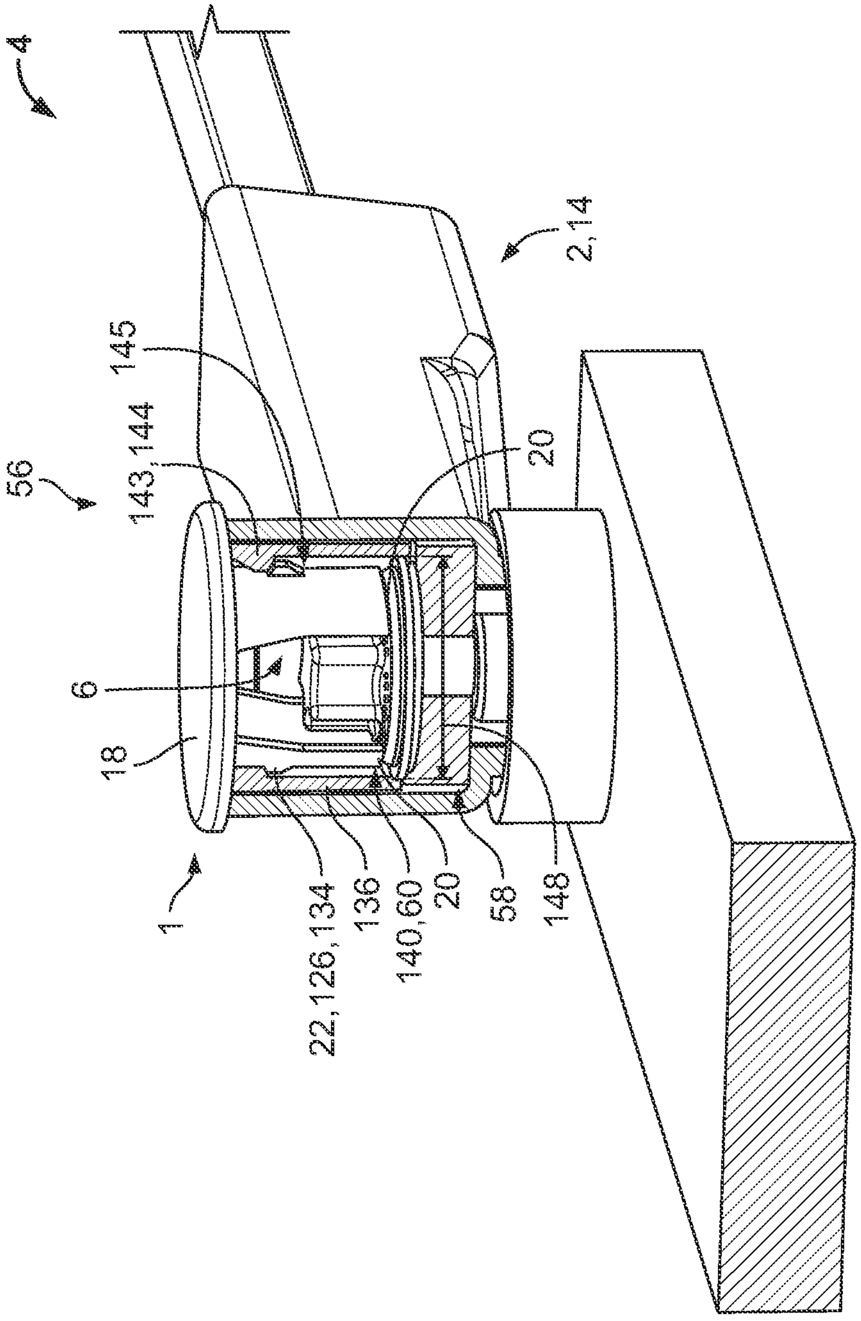
FIG. 5 is a sectional perspective view of an electrical connection assembly with a housing cap according to a third embodiment.

Housing 2 shown in FIGS. 3 and 4 comprises housing cap 1 and a housing part 54 with the at least one opening 16. In the embodiments shown by way of example, housing part 54 has only one opening 16. Of course, housing part 54 can also have several openings. In this case, a housing cap 1 can be provided for all or at least several openings. Alternatively, a single housing cap 1 can also be provided for every opening.

Housing cap 1 is configured such that it can be mounted onto the at least one opening 16. In the mounted state 56 of housing cap 1, the at least one stop 20 protrudes into the at least one opening 16 (see FIG. 4).

Figure 6:
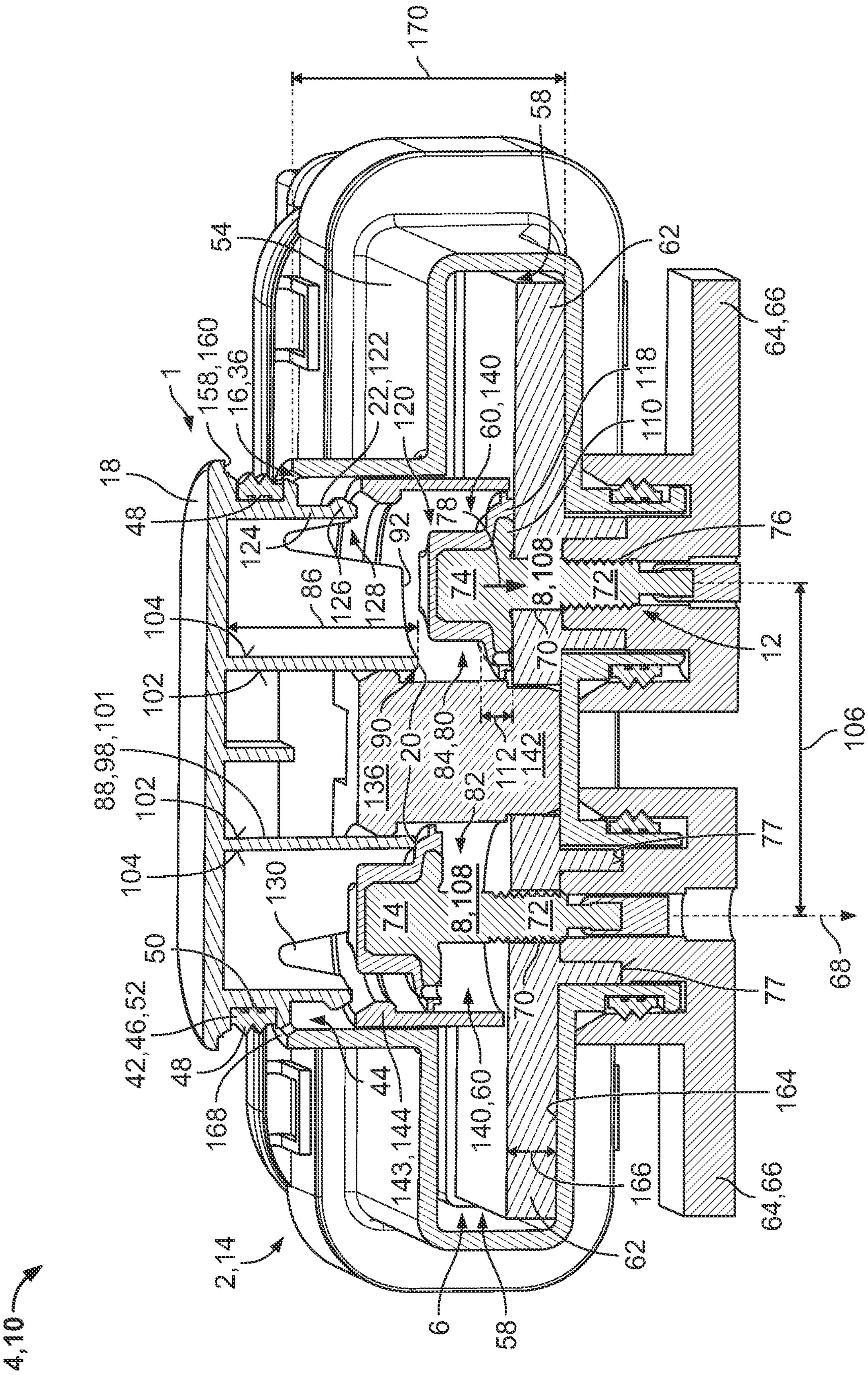
FIG. 6 is a sectional perspective view of an electrical connection assembly with the housing cap of FIG. 2.
Figure 7:
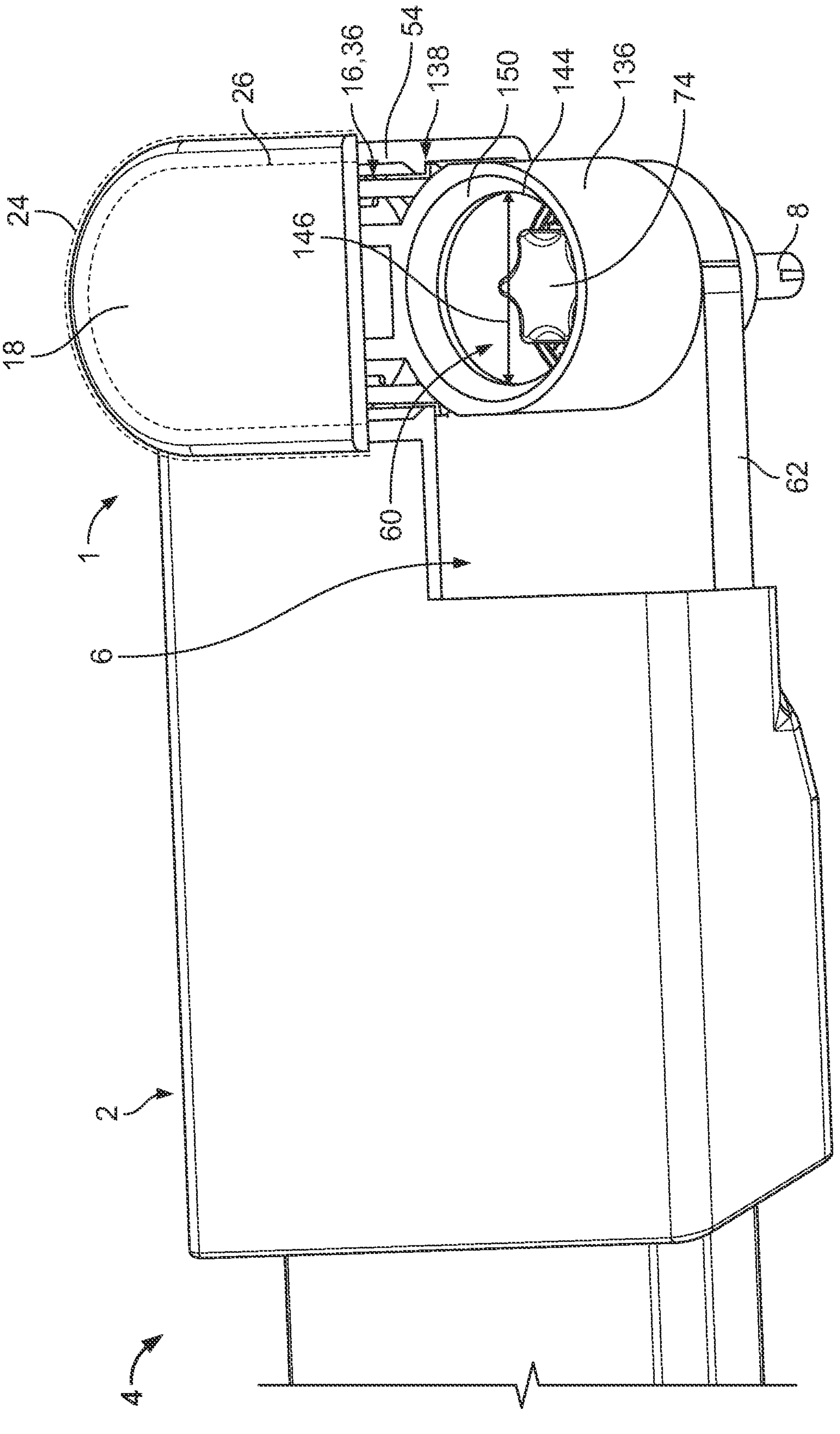
FIG. 7 is a sectional perspective view of an electrical connection assembly according to another embodiment.

As can also be seen from the sectional illustrations shown, housing 2 comprises a power rail receptacle 58 and at least one screw head receptacle 60 that opens into power rail receptacle 58. In the exemplary embodiments shown in FIGS. 3 to 5, housing 2 comprises only one power rail receptacle 58 and one screw head receptacle 60. FIG. 6 shows by way of example a housing 2 with two power rail receptacles 58 and two screw head receptacles 60. Depending on the application, yet more power rail receptacles 58 and/or screw head receptacles 60 can of course be provided. Advantageously, several screws 8 can be inspected at the same time with the housing cap 1, which represents an aid for assembly, repair, and/or maintenance work.

FIGS. 3 and 4 show electrical connection assembly 4 which, in addition to housing 2, comprises at least one power rail 62 received in power rail receptacle 58 of housing 2, at least one screw 8 and at least one contact element 64, for example, a battery terminal 66. Connection assembly 4 from FIGS. 3 and 4 comprises a power rail 62, a screw 8, and a contact element 64. As shown in FIG. 6, connection assembly 4 can also comprise two power rails 62, two screws 8, and two contact elements 64. Depending on the application, even more power rails 62, screws 8 and/or contact elements 64 can of course be provided. At least one screw 8 and one contact element 64 are preferably present for each power rail 62.

The at least one power rail 62 may be made of metal (e.g. copper, aluminum) and/or a different electrically conductive material and comprises a passage hole 70 aligned with at least one screw head receptacle 60 in axial direction 68 of at least one screw 8. Passage hole 70 can be, for example, a circular passage hole, an oval passage hole, or an elongate hole.

The at least one screw 8 has a thread 72 and a screw head 74, while the at least one contact element 64 has a mating-thread 76 configured to be complementary to thread 72 (see FIG. 6). The at least one screw 8 and/or the at least one contact element 64 may be likewise made of metal (e.g. copper, aluminum) and/or a different electrically conductive material.

In the exemplary embodiment from FIG. 6, mating-thread 76 is formed directly in the material of respective contact element 64, for example, by way of tapping, thread cutting, thread milling, thread pressing, thread forming or using another thread production method. Alternatively, the at least one contact element 64 can additionally comprise a separate component that has mating-thread 76. In particular, the separate component can be a nut, for example, an insert nut inserted on the other side or a nut overmolded with a touch guard made of electrically non-conductive material. Furthermore, the separate component can also be, for example, a threaded sleeve that is pressed in, welded on, caulked and/or fastened in some other way.

Furthermore, passage hole 70 may be aligned with at least one screw head receptacle 60 in axial direction 68. Respective contact surfaces 77 of the at least one power rail 62 and of the at least one contact element 64 can therefore contact one another and form an electrically conductive connection with a contact force 78 generated by the at least one screw 8.

For this purpose, the at least one screw 8, in particular its thread 72, is inserted into passage hole 70 of the at least one power rail 62 and mating-thread 76 of the at least one contact element 64. Consequently, the at least one screw 8 can be moved to a final assembly position 80 (see FIG. 4) in which it is completely screwed into mating-thread 76. In other words, the at least one screw 8 can be screwed into mating-thread 76 from a position 82 in which it is screwed in incompletely (see FIG. 3) to a position 84 in which it is screwed in completely (see FIG. 4), whereby the at least screw head 74 moves in axial direction 68. To move the at least one screw 8 to its final assembly position 80, screw head 74 is accessible from the outside via the at least one opening 16, in particular for a corresponding screwing tool, provided that housing cap 1 is not in mounted state 56. In particular, screw head 74 is there arranged in at least one screw head receptacle 60 of housing 2.

The at least one stop 20 of housing cap 1 in mounted state 56 of housing cap 1 is aligned with at least one screw head receptacle 60 in axial direction 68. In order to prevent housing cap 1 from being mounted on the at least one opening 16 while the at least one screw 8 is still in position 82 in which it is screwed in incompletely or at least not in final assembly position 80, the at least one stop 20 is also configured to strike screw head 74 under these circumstances and to block the at least one opening 16 to be covered by cover section 18 (see FIG. 3). In other words, the at least one stop 20 is configured to rest precisely on screw head 74 of the at least one screw 8 in position 84 in which it is screwed in completely and only then to enable at least one opening 16 to be covered by cover section 18 (see FIG. 4). For this purpose, the at least one stop 20 of housing cap 1 in its mounted state 56 protrudes so far into the at least one opening 16 that it reaches exactly up to screw 8 disposed in final assembly position 80. The at least one stop 20 there reaches the at least one screw 8 if a length 86 measured perpendicular to cover section 18 (see FIG. 1) extends between cover section 18 and stop 20 up to screw 8, in particular to its screw head 74.

Figure 2:
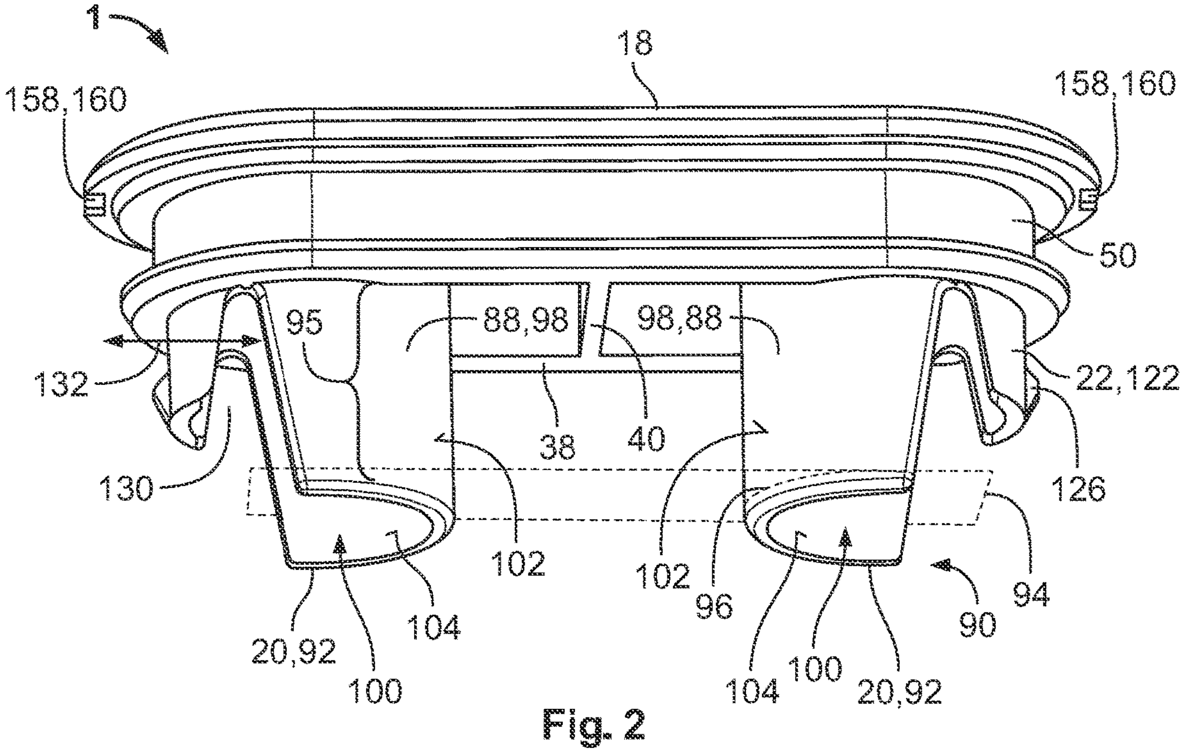
FIG. 2 is a perspective view of a housing cap according to a second embodiment.

As can be seen from FIGS. 1 and 2, housing cap 1 can comprise at least one spacing element 88 projecting from cover section 18, wherein the at least one stop 20 is arranged on this spacing element 88. In particular, stop 20 is located at an end 90 of spacing element 88 facing away from cover section 18. Stop 20 may be formed by an edge 92 of spacing element 88 pointing away from cover section 18.

The at least one spacing element 88 may have a reinforcement zone 95 to increase its dimensional stability; the at least one spacing element 88 does not kink or break away, even with a comparatively small material thickness. It can be clearly seen from FIG. 2 that the at least one spacing element 88 has a curved cross section 96, in particular in a plane 94 parallel to cover section 18, for creating reinforcement zone 95. For example, the at least one spacing element 88 is configured as a semi-tubular shape, a hollow cylinder segment, or a hollow rotating body segment. In particular, the at least one spacing element 88 can be configured as a collar 98 which extends at least in sections around a receiving region 100 for receiving at least part of screw head 74. Collar 98 may be curved around receiving region 100. Edge 92 of spacing element 88 forming stop 20 is configured accordingly to have the shape of a segment of a circle or at least to be curved. Alternatively, the at least one spacing element 88 can have an angled cross-section in plane 94 to create reinforcement zone 95. In an embodiment, the cross section is curved or angled in a plane parallel to the cover section 18. Reinforcement zone 95 can also be created by a bead or rib extending along spacing element 88.

Housing cap 1 may have at least one stop 20 for each screw 8. The embodiments of housing cap 1 shown in FIGS. 1 and 2 each comprise two spacing elements 88, on each of which a stop 20 is arranged. In FIG. 2, two spacing elements 88 are each configured as collars 98 and each surround a receiving region 100 for one screw head 74 each. Spacing elements 88 can be configured to be symmetrical, in particular mirror-symmetrical to one another. In the embodiment of FIG. 1, spacing elements 88 are each configured as shovel- or spade-shaped projections 101 and together surround a receiving region 100 for a screw head 74.

Two spacing elements 88 can also each have a convex, bulged, protruding or raised side surface 102 and a concave, indented or recessed side surface 104. In the case of housing cap 1 shown in FIG. 1, concave side surfaces 104 of two spacing elements 88 face one another, whereas FIG. 2 shows two spacing elements 88 with convex side surfaces 102 facing one another.

Spacing elements 88 with concave side surfaces 104 facing one another are suitable, as already described, to jointly surround a receiving region 100. Respective stops 20 on these spacing elements 88 can therefore rest on one and the same screw head 74, resulting in improved support stability. The respective stops 20 on the spacing elements 88 also create redundancy in the event that a spacing element 88 should break off. In applications with two screws 8, each spacing element 88 can rest with its respective stop upon one screw head 8. In addition, there is a certain redundancy in the event that one spacing element 88 should break off The advantage of the embodiment of housing cap 1 with the two spacing elements 88 with convex side surfaces 102 facing one another comes to play primarily in electrical connection assemblies 4 with two screws 8, in particular two screws 8 extending in parallel (see FIG. 6). With a predetermined distance 106 between screws 8 and under the condition that one spacing element 88 each is aligned with one respective screw head 74 in axial direction 68, spacing elements 88 can be arranged as close as possible to one another by facing their convex side surfaces 102 towards one another. Stops 20 are also correspondingly close. This in turn means that even a small difference in height between screw heads 74, such as occurs, for example, when at least one of two screws 8 is not in final assembly position 80, results in the greatest possible angle of inclination of housing cap 1. Consequently, the presence of an angle of inclination due to a screw 8 not being in final assembly position 80 can be more easily recognized using this embodiment.

In the case of a housing cap 1 with more than two spacing elements 88, in particular with an even number of spacing elements 88, pairs of convex side surfaces 102 and/or concave side surfaces 104 can face one another. Convex side surfaces 102 can also face concave side surfaces 104 and vice versa, for example, for reasons of space.

As can be seen in FIGS. 3 to 6, the at least one screw 8 can be a flange screw 108. In other words, the at least one screw 8 can have a flange 110 having a predetermined flange face thickness 112. For example, the at least one screw can be configured as a hexagonal screw with a flange, a flat head screw, or a washer head screw. Passage hole 70 of the at least one power rail 62 can be surrounded by a bearing surface 114 (see FIG. 3) for screw head 74, in particular for flange 108. In mounted state 56 of housing cap 1, a distance 116 measured in axial direction 68 between bearing surface 114 and the at least one stop 20 corresponds to flange face thickness 112 (see FIG. 4). Screw head 74 can optionally comprise a touch guard 118 made of an electrically non-conductive material. Accordingly, the at least one stop 20 can strike or bear against touch guard 118. The material thickness of the touch guard is there included in flange face thickness 112.

A distance 170 between an upper edge 168 of the at least one opening 16 and a bottom surface 164 of power rail receptacle 58 corresponds in general to the sum of material thickness 166 of the at least one power rail 62, flange face thickness 112, and length 86 from cover section 18 to the at least one stop 20 (see FIG. 6).

Alternatively, the at least one screw 8 can also be formed without a flange 110. The at least one stop 20 can then, for example, strike or bear against end 120 of screw head 74 facing away from thread 72. In this case, distance 116, when housing cap 1 is in mounted state 56, corresponds to a head height of screw head 74 measured in axial direction 68. Receiving region 100 for screw head 74 can then be omitted accordingly.

Particularly in the case of screws 8 whose screw head 74 in screw head receptacle 60 completely obscures the view onto bearing surface 114, the screwing depth of screw 8 is only difficult to estimate, so that slight deviations of screw 8 from its final assembly position 80 are difficult to detect from the outside. This is evident from FIG. 7, where a diagonal top view into a screw head receptacle 60 is shown. Housing cap 1 according to the invention provides a remedy there.

As described so far, housing cap 1 cannot be mounted on the at least one opening 16 of housing part 54, at least not completely, if the at least one stop 20 of housing cap 1 abuts against screw head 74 when screw 8 has been moved away from final assembly position 80. Under these circumstances, housing cap 1 may also not be fastened to the remainder of housing 2. The presence of a screw 8 that is not in final assembly position 80 can also be recognized by way of at least one fastening element 22 described hereafter which is used to fasten housing cap 1 to the remainder of housing 2.

The at least one fastening element 22 can be arranged on cover section 18 and/or on the at least one spacing element 88. The at least one fastening element 22 in FIGS. 1 to 4 is configured in particular as a latching hook 122 projecting from cover section 18. Latching hook 122 has a self-supporting arm 124 that extends at least in part along spacing elements 88 shown. Furthermore, latching hook 122 comprises a latching projection 126 which projects laterally from free end 128 of the self-supporting arm 124.

Latching hook 122 optionally comprises an angular offset to spacing elements 88 with respect to receiving region 100. In particular, latching hook 122 is separated from spacing elements 88 by a respective flexural gap 130. Flexural gap 130 there reduces the flexural rigidity of latching hook 122 so that an elastic deflection 132 perpendicular to axial direction 68 is facilitated. Alternatively, the at least one fastening element 22 can also be configured as a latching projection 126, in particular a latching tab 134 (see FIG. 5), projecting laterally from spacing element 88.

Latching projection 126 may be arranged on self-supporting arm 124 or on spacing element 88 pointing outwardly with respect to receiving region 100. Alternatively, latching projection 126 can also be configured to point inwardly. Elastic deflection 132 just mentioned can correspondingly take place inwardly or outwardly.

As can be seen from FIGS. 3 to 7, housing 2 comprises a housing insert 136 which can be inserted into the at least one opening 16 and fastened to housing part 54. Housing insert 136 is fastened to housing part 54, for example, by way of a latching connection 138 (see FIG. 7). Furthermore, the at least one screw head receptacle 60, in particular formed as a passage opening 140, is arranged in housing insert 136. One passage opening 140 each can there form a screw head receptacle 60.

In embodiments of connection assembly 4 with two power rails 62, housing insert 136 can also be used as a separating element 142 between two power rails 62 and/or screws 8 (see FIG. 6). Housing insert 136 may be made of electrically non-conductive material. Housing cap 1 and/or housing part 54 may likewise made of electrically non-conductive material.

Housing insert 136 may be configured to be insertable after the at least one screw 8 into the at least one opening 16. Housing insert 136 can therefore be used to hold at least one screw 8 in a captive manner already prior to housing cap 1 being mounted. For this purpose, housing insert 136 can comprise a latching collar 144 protruding inwardly into the at least one screw head receptacle 60. Optionally, latching collar 144 is configured to extend around the at least one screw head receptacle 60. An inner diameter 146 (see FIG. 7) of latching collar 144 may be smaller than an outer diameter 148 (see FIG. 5) of screw head 74 arranged in screw head receptacle 60. Consequently, latching collar 144 can prevent screw 8 from accidentally dropping out or being removed.

In the embodiments shown, latching projections 126 of respective fastening elements 22 are configured such that they can be latched to latching collar 144. In this way, housing cap 1 can latch onto latching collar 144 so that latching collar 144 fulfills a dual function. Firstly, the housing cap 1 can latch thereonto. Secondly, the at least one screw 8 can be held captively in the at least one screw head receptacle 60 with the latching collar 144, as described above.

Latching collar 144 can optionally form an insertion bevel 150 of the at least one opening 16 and/or of the at least one screw head receptacle 60. In particular, above-mentioned elastic deflection 132 can be caused in the context of housing cap 1 being mounted once latching projections 126 come up against insertion bevel 150. After latching collar 144 has been overcome, elastic deflection 132 is canceled out again by the relaxation of the material and latching projections 126 engage with latching collar 144 (see FIG. 5). This engagement may be accompanied by a clicking sound which can be used as an audible indicator as described below.

In mounted state 56 of housing cap 1, latching projections 126 can touch latching collar 144 at predetermined touch surfaces 152, as shown in FIG. 4. In order to synchronize the occurrence of the audible indicator with the at least one stop 20 resting on screw head 74, these touch surfaces 152 are at same distance 154, measured in axial direction 68, from the at least one stop 20 when housing cap 1 is in mounted state 56. The absence of the audible indicator then necessarily indicates the presence of at least one screw 8 outside of final assembly position 80, especially since distance 154 between touch surface 152 on latching collar 144 and the at least one stop 20 depends on the position of screw head 74, whereas distance 154 between touch surface 152 on latching projection 126 and the at least one stop 20 is structurally defined.

In order to make it easier to remove housing cap 1, latching collar 144 can comprise a draw-off bevel 156, as shown in FIG. 3. Draw-off bevel 156 may be arranged on the other side of insertion bevel 150 and meets insertion bevel 150 at inner diameter 146 of latching collar 144, for example at an obtuse angle. Furthermore, insertion bevel 150 is arranged facing the at least one screw head receptacle 60. In addition to or as an alternative to insertion bevel 150 and/or to draw-off bevel 156, latching projections 126 can be formed to be beveled. In particular, when housing cap 1 is in mounted state 56, latching projections 126 can touch latching collar 144 at touch surfaces 152 which are inclined with respect to axial direction 68.

Housing 2 can optionally comprise at least one point of engagement 160, e.g. a recess 158, for inserting a tool tip between housing cap 1 and housing part 54. The at least one point of engagement 160 simplifies lifting off or levering open housing cap 1 with a tool, such as a screwdriver. For example, at least one recess 158 is configured as a lateral depression 160 in cover section 18. One point of engagement 160 may be provided for each latching projection 126 of housing cap 1 with respect to housing cap 1 at a respective angular position. In other words, there is no angular offset between latching projection 126 and point of engagement 162.

In applications in which housing cap 1 is not intended to be removable but instead is intended, for example, to serve as protection against tampering, draw-off bevel 156 can also be omitted. In particular, when housing cap 1 is in mounted state 56, latching projections 126 can touch latching collar 144 at touch surfaces which are perpendicular with respect to axial direction 68. In the mounted state 56 of housing cap 1, latching projections 126 can optionally also engage behind latching collar 144 in the manner of a barb.

If there is no need for the at least one screw 8 to be held in a captive manner, latching collar 144 can also alternatively be arranged on the outside of housing part 54 according to an embodiment that is not shown. In this embodiment, latching projections 126 can accordingly be configured to point inwardly and latch with latching collar 144 arranged on the outside.

In addition to or instead of latching collar 144, housing insert 136 can comprise a latching groove and the at least one fastening element 22 of housing cap 1 can be configured such that it can be latched to the latching groove. Alternatively, the latching collar 144 and/or the latching groove can also be arranged on the outside of the housing part 54, where the latching projection of the at least one fastening element 22 correspondingly points inwardly.

In general, at least one anchoring element 143 can be arranged on housing insert 136 and form a fastening assembly 145 with the at least one fastening element 22 of housing cap 1. The anchoring element 143 can be a mating part configured to be complementary to the at least one fastening element 22 of the housing cap 1. The at least one fastening element 22 can be arranged at the cover section 18 and/or at the at least one spacing element 88. The housing cap 1 can therefore be affixed in a simple manner on the at least one opening 16.

As an alternative to latching assembly 145 described so far, a bayonet connection can also be provided. In this case, the at least one fastening element 22 can be configured, for example, as a bayonet pin or bayonet button which engages in a bayonet groove in housing part 54 or housing insert 136. Additionally or alternatively, housing cap 1 and housing part 54 or housing insert 136, respectively, can establish a frictionally engaged connection. Other types of positive-fit, positive substance-fit, and/or force-fit connections are of course also conceivable.

The housing cap 1 according to the invention can be used, for example, as a retrofit component for a housing part that has already been manufactured and installed, for example, as part of maintenance or repair work, and can replace a conventional housing cap that is already present. It can be ensured in particular with the housing cap 1 according to the invention that the at least one screw 8 has been screwed in completely after the maintenance or repair work. Since mounting the housing cap 1 is part of the maintenance or repair work anyway, this does not create any additional work.

Furthermore, a housing cap 1 that is not mounted or not mounted correctly is easier to recognize from the outside than a screw 8 that is not screwed in or is not screwed in completely, so that the detection reliability is also increased by the present invention.

The connection assembly 4 utilizes the advantages of the invention that have already been described and due to the housing cap 1 of the housing 2 possesses an integrated control mechanism that ensures that the at least one screw 8 is screwed in completely. As a result, the connection assembly 4 according to the invention is less susceptible to incorrect assembly, without additional work or time being required for this. In particular, the electrical and thermal safety of the connection assembly 4 according to the invention increases because unwanted excessive heating during operation is prevented. Because such excessive heating could be caused due to an increase in contact resistance by an overlooked screw 8 that is not screwed in completely and the resulting lack of contact force.

What is claimed is:

1. A housing cap for closing an opening of a housing part, comprising:
- a cover section covering the opening;
- a spacing element having a reinforcement zone;
- a stop projecting away from the cover section;
- a fastening element affixing the housing cap to the opening;
- wherein the spacing element is one of a pair of spacing elements, and one stop is arranged on each spacing element.

2. The housing cap of claim 1, wherein the spacing element projects from the cover section.

3. The housing cap of claim 1, wherein the stop is arranged on the spacing element.

4. The housing cap of claim 1, wherein the stop of the housing cap in a mounted state is aligned with a screw head receptacle of a housing, in an axial direction.

5. The housing cap of claim 1, wherein the fastening element has latching projections latch-able to a latching collar of the housing.

6. The housing cap of claim 1, wherein the spacing elements each have a convex side surface and a concave side surface.

7. The housing cap of claim 6, wherein the convex side surfaces or the concave side surfaces of the spacing elements face each other.

8. A housing for an electrical connection assembly, comprising:
- a housing part having an opening;
- a housing cap having a cover section covering the opening of the housing part opening, a stop projecting away from the cover section, and a fastening element affixing the housing cap to the opening, the housing has a point of engagement receiving a tool tip between the housing cap and the housing part;
- an anchoring element forming a fastening assembly with the fastening element;
- a power rail receptacle receiving an electrical power rail; and
- a screw head receptacle that opens into the power rail receptacle and receives a screw head of a screw.

9. The housing of claim 8, wherein the anchoring element is a latching collar protruding inwardly into the screw head receptacle.

10. The housing of claim 8, wherein an outer contour of the cover section of the housing cap is larger than or equal to an inner contour of the opening of the housing part.

11. The housing of claim 8, further comprising a housing insert insertable into the opening and fastened to the housing part.

12. The housing of claim 11, wherein the housing insert forms the screw head receptacle.

13. The housing of claim 8, wherein the screw head receptacle is one of a pair of screw head receptacles.

14. The housing of claim 13, wherein the housing cap has at least one stop for each of the screw head receptacles.

15. An electrical connection assembly, comprising:
- a housing including a housing part having an opening, a housing cap, a power rail receptacle, and a screw head receptacle that opens into the power rail receptacle, the housing cap has a cover section covering the opening of the housing, a stop projecting away from the cover section, and a fastening element affixing the housing cap to the opening;
- a power rail received in the power rail receptacle and having a passage hole;
- a screw inserted into the passage hole, the screw having a thread, a screw head, and a flange with a flange face thickness; and
- a contact element with a mating thread complementary to the thread of the screw.

16. The electrical connection assembly of claim 15, wherein a distance between an upper edge of the opening and a bottom surface of the power rail receptacle corresponds to a sum of a material thickness of the power rail, the flange face thickness, and a length from the cover section to the stop.

17. The electrical connection assembly of claim 15, wherein the screw is one of a pair of screws and the housing cap has at least one stop for each of the screws.

18. An electrical connection assembly, comprising:
- a housing including a housing part having an opening, a housing cap, a power rail receptacle, and a screw head receptacle that opens into the power rail receptacle, the housing cap has a cover section covering the opening of the housing part, a stop projecting away from the cover section and a fastening element affixing the housing cap to the opening;
- a power rail received in the power rail receptacle and having a passage hole;
- a pair of screws wherein at least one screw is inserted into the passage hole, the at least one screw having a thread and a screw head, and the housing cap has at least one stop for each of the screws; and a contact element with a mating thread complementary to the thread of the at least one screw.

19. A housing cap for closing an opening of a housing part, comprising:

a cover section covering the opening;

a spacing element having a reinforcement zone, the spacing element having a curved cross section in a plane parallel to the cover section, defining the reinforcement zone;

a stop projecting away from the cover section; and a fastening element affixing the housing cap to the opening.

* * * * *